(12) United States Patent
Janicek et al.

(10) Patent No.: US 10,903,912 B2
(45) Date of Patent: Jan. 26, 2021

(54) METHOD AND APPARATUS FOR NONLINEAR COMPENSATION IN COHERENT OPTICAL LINKS

(71) Applicant: HUAWEI TECHNOLOGIES CO., LTD., Guangdong (CN)

(72) Inventors: Rene Janicek, Stittsville (CA); Jeebak Mitra, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/872,967

(22) Filed: May 12, 2020

(65) Prior Publication Data

US 2020/0366380 A1 Nov. 19, 2020

Related U.S. Application Data

(60) Provisional application No. 62/849,708, filed on May 17, 2019.

(51) Int. Cl.
*H04B 10/06* (2006.01)
*H04B 10/61* (2013.01)
(Continued)

(52) U.S. Cl.
CPC ... *H04B 10/6163* (2013.01); *H04B 10/07951* (2013.01); *H04B 10/6161* (2013.01); *H04B 10/6971* (2013.01)

(58) Field of Classification Search
CPC .............. H04B 10/616; H04B 10/6161; H04B 10/6163; H04B 10/6164; H04B 10/6165;
(Continued)

(56) References Cited

U.S. PATENT DOCUMENTS

2014/0356003 A1\* 12/2014 Randel ................. H04B 10/616
398/210
2015/0236656 A1 8/2015 Utsunomiya et al.
(Continued)

FOREIGN PATENT DOCUMENTS

CN 104601239 A 5/2015

OTHER PUBLICATIONS

Guiomar et al., Multicarrier Digital Backpropagation for 400G Optical Superchannels, Journal of Lightwave Technology, vol. 34, No. 8, Apr. 15, 2016.
(Continued)

*Primary Examiner* — Hanh Phan
(74) *Attorney, Agent, or Firm* — BCF LLP

(57) ABSTRACT

The disclosed structures and methods are directed to a method for compensation of linear and nonlinear effects in optical fiber of a coherent optical signal transmitted through an optical link. The method comprises receiving a coherent optical signal having carriers; determining values of intensity vectors for each carrier; determining values of filtered intensity vectors for each carrier by filtering the values of the intensity vectors at frequencies lower than a cut-off frequency of a filter; determining nonlinear compensation coefficients for each carrier based on the filtered intensity vectors; and modifying the digital coherent optical signal based on the nonlinear compensation coefficients.

20 Claims, 11 Drawing Sheets

(51) Int. Cl.
*H04B 10/079* (2013.01)
*H04B 10/69* (2013.01)

(58) Field of Classification Search
CPC .. H04B 10/613; H04B 10/40; H04B 10/6971; H04J 14/02
USPC ....... 398/202, 208, 209, 204, 205, 206, 207, 398/158, 159, 79, 81, 135, 136, 137, 138, 398/139, 183, 188
See application file for complete search history.

(56) References Cited

U.S. PATENT DOCUMENTS

| | | | |
|---|---|---|---|
| 2015/0372766 A1* | 12/2015 | Yoshida | H04B 10/61 398/193 |
| 2016/0197680 A1 | 7/2016 | Lei et al. | |
| 2017/0237498 A1* | 8/2017 | Essiambre | H04B 10/2543 398/136 |

OTHER PUBLICATIONS

Zhang, Fangyuan et al. XPM Model-Based Digital Backpropagation for Subcarrier-Multiplexing Systems Journal of Lightwave Technology Dec. 15, 2015(Dec. 15, 2015), total 11 pages.
International Search Report of PCT/CN2020/090730; Yongjiao Yu; dated Aug. 18, 2020.

* cited by examiner

METHOD AND APPARATUS FOR NONLINEAR COMPENSATION IN COHERENT OPTICAL LINKS

CROSS-REFERENCE TO RELATED APPLICATIONS

This application claims the benefit of priority to U.S. Patent Application Ser. No. 62/849,708 filed on May 17, 2019 and entitled "Method and Apparatus for Nonlinear Compensation in Coherent Optical Links", the contents of which are incorporated herein by reference.

FIELD OF THE INVENTION

The present invention generally relates to the field of optical communications and in particular to coherent optical links.

BACKGROUND

Various techniques have been developed to increase data throughputs in optical networks, in particular in wavelength division multiplexing (WDM) networks. These techniques include increasing a symbol rate and increasing a modulation order of an optical signal by using, for example, a multi-level quadrature amplitude modulation (QAM). A set of channels, typically frequency adjacent to each other, can be combined to form what is referred to as a superchannel. In some embodiments, each of the channels in the superchannel makes use of a distinct set of wavelengths, and may use different signal sources (e.g. different lasers).

To transmit an optical signal having a high symbol rate and high modulation order over a long-distance optical link, the launch power at the source transceiver needs to be sufficiently high to ensure that the signal can be detected at the destination transceiver. In transmission through an optical channel, the optical signal experiences so-called nonlinear effects due to fiber nonlinearities. These nonlinear effects tend to increase with the increase of the launch power. Examples of the nonlinear optical effects include both self-phase modulation (SPM) and cross-phase modulation (XPM). When multiple sub-channels are placed adjacent to each other to form a superchannel, the XPM may degrade performance significantly at higher launch powers.

The impact of linear impairments in a dual-polarized fiber-optic transmission, such as chromatic dispersion and polarization mode dispersion, can be efficiently compensated by linear equalization techniques. Impairments due to nonlinear effects are considered to be the major impediment to achieving the full capacity of the fiber optic channel. Therefore, there is a pressing need for an efficient method to mitigate the impact of nonlinear effects, particularly with multiple closely spaced or overlapping carriers and sub-channels.

SUMMARY

An object of the present disclosure is to provide apparatuses, systems and methods for compensation of both linear and nonlinear effects in optical fiber.

In accordance with this objective, an aspect of the present disclosure provides a method for compensation of linear and nonlinear effects in optical fiber of a coherent optical signal transmitted through an optical link. The method comprises: receiving a coherent optical signal comprising carriers; determining values of intensity vectors for each carrier; determining values of filtered intensity vectors for each carrier by filtering the values of the intensity vectors at frequencies lower than a cut-off frequency of a filter, the cut-off frequency being less than a half of a carrier bandwidth; determining nonlinear compensation coefficients for each carrier based on the filtered intensity vectors; and modifying the digital coherent optical signal based on the nonlinear compensation coefficients determined based on the filtered intensity vectors.

In some embodiments, the digital coherent optical signal is received after performing multiple input multiple output equalization for removing effects of polarization mode dispersion (PMD).

In some embodiments, the received coherent optical signal has been already compensated using a frequency domain equalizer for a chromatic dispersion and a value of the chromatic dispersion has been already determined from the received signal, and a frequency offset and a phase noise have been already compensated for, and the method further comprises adding a value of chromatic dispersion to the received digital coherent optical signal.

In some embodiments, after the step of receiving the digital coherent optical signal and before the step of determining values of the intensity vectors, chromatic dispersion in the digital coherent optical signal is determined; and after the step of modifying the digital coherent optical signal based on the nonlinear compensation coefficients, multiple input multiple output equalization to the modified digital coherent optical signal is applied.

In some embodiments, the filter is a low-pass filter. In some embodiments, the carriers are sub-channels of a super-channel.

In some embodiments, the nonlinear compensation coefficients are determined based on a self-phase modulation (SPM) free parameter and a cross-phase modulation (XPM) free parameter.

In some embodiments, a carrier is one of the sub-channels of an optical superchannel and the filtered intensity vectors for the carrier are obtained: by filtering the values of the intensity vectors by a self-phase modulation (SPM) filter to determine an SPM contribution to the nonlinear compensation coefficients for the carrier, and by filtering the values of the intensity vectors of neighboring carriers to the carrier by a cross-phase modulation (XPM) filter to determine an XPM contribution to the nonlinear compensation coefficients for the carrier.

In some embodiments, the SPM filter and XPM filter have different bandwidths.

In some embodiments, the method further comprises, for each carrier: determining an SPM free parameter and an SPM filter coefficient of the SPM filter based on a first plurality of bit error rates; and determining an XPM free parameter and an XPM filter coefficient of the XPM filter based on a second plurality of bit error rates.

In some embodiments, the filtered intensity vectors for each carrier are determined based on a self-phase modulation (SPM) filter and cross-phase modulation (XPM) filter; the nonlinear compensation coefficients are determined based on a selected SPM free parameter, a selected XPM free parameter, a selected SPM filter bandwidth of the SPM filter, and a selected XPM filter bandwidth of the XPM filter; and the selected SPM filter bandwidth and the selected SPM free parameter are determined by: for each value of an SPM filter bandwidth of a plurality of SPM filter bandwidths, and based on a default value of XPM filter bandwidth, a default value of SPM free parameter, and a default value of XPM free parameter, determining a first plurality of bit error rates;

setting the selected SPM filter bandwidth to have the value of one of the plurality of SPM filter bandwidths corresponding to the lowest bit error rate of the first plurality of bit error rates; for each value of an SPM free parameter of a plurality of SPM free parameters, and based on the default value of XPM filter bandwidth, the default value of XPM free parameter, and the selected SPM filter bandwidth, determining a second plurality of bit error rates; and setting the selected SPM free parameter to have the value of one of the plurality of SPM free parameters corresponding to the lowest bit error rate of the second plurality of bit error rates.

In some embodiments, the method further comprises: for each value of an XPM filter bandwidth of a plurality of XPM filter bandwidths, and based on the default value of XPM free parameter, the selected SPM free parameter, and the selected SPM filter bandwidth, determining a third plurality of bit error rates; setting the selected XPM filter bandwidth to have the value of one of the plurality of XPM filter bandwidths corresponding to the lowest bit error rate of the third plurality of bit error rates; for each value of an XPM free parameter of a plurality of XPM free parameters, and based on the selected SPM filter bandwidth, the selected XPM filter bandwidth, and the selected SPM free parameter, determining a fourth plurality of bit error rates; and setting the selected XPM free parameter to have the value of one of the plurality of XPM free parameters corresponding to the lowest bit error rate of the fourth plurality of bit error rates.

In accordance with additional aspects of the present disclosure, there is provided an apparatus for compensation of linear and nonlinear effects in optical fiber of a coherent optical signal transmitted through an optical link, the apparatus comprising: a photodetector configured to receive an optical signal comprising carriers each having a carrier bandwidth; and a processor configured to: receive a digital coherent optical signal having carriers; determine values of intensity vectors for each carrier; determine values of filtered intensity vectors for each carrier by filtering the values of the intensity vectors at frequencies lower than a cut-off frequency of a filter, the cut-off frequency being less than a half of a carrier bandwidth; determine nonlinear compensation coefficients for each carrier based on the filtered intensity vectors; and modify the digital coherent optical signal based on the nonlinear compensation coefficients determined based on the filtered intensity vectors.

In accordance with additional aspects of the present disclosure, there is provided a non-transitory computer readable medium with computer executable instructions stored thereon that, when executed by a processor, cause the processor to: receive a digital coherent optical signal having carriers; determine values of intensity vectors for each carrier; determine values of filtered intensity vectors for each carrier by filtering the values of the intensity vectors at frequencies lower than a cut-off frequency of a filter, the cut-off frequency being less than a half of a carrier bandwidth; determine nonlinear compensation coefficients for each carrier based on the filtered intensity vectors; and modify the digital coherent optical signal based on the nonlinear compensation coefficients determined based on the filtered intensity vectors.

Other aspects of the present disclosure provide for compensation of nonlinear effects in an optical fiber on a coherent optical wavelength division multiplexed (WDM) signal transmitted through an optical link. The method comprising: receiving a coherent optical signal comprising a plurality of sub-channels; digitizing the received coherent optical signal to generate a digital receive coherent optical signal; determining instantaneous values of intensity vectors for each of the plurality of sub-channels of the digital receive coherent optical signal; determining values of filtered intensity vectors for each of the plurality of sub-channels of the digital receive coherent optical signal by filtering the values of the intensity vectors at frequencies lower than a cut-off frequency of a filter, the cut-off frequency being less than a half of a sub-channel bandwidth; determining nonlinear compensation coefficients for each of the plurality of sub-channels of the digital receive coherent optical signal based on the filtered intensity vectors associated with at least one other sub-channel in the plurality of sub-channels; and modifying the digital receive coherent optical signal in accordance with the determined nonlinear compensation coefficients based on the filtered intensity vectors.

In yet other aspects of the present disclosure, there is provided an apparatus for compensation of nonlinear effects in optical fiber of a coherent optical signal transmitted through an optical link. The apparatus comprising: a photodetector configured to receive a coherent optical wavelength division multiplexing (WDM) signal comprising sub-channels each having a finite bandwidth; an analog-to-digital converter configured to convert the received coherent optical signal into a digital receive coherent optical signal; and a processor configured to: determine instantaneous values of intensity vectors for each sub-channel of the digital receive coherent optical signal; determine values of filtered intensity vectors for each sub-channel of the digital receive coherent optical signal by filtering the instantaneous values of the intensity vectors at frequencies lower than a cut-off frequency of a filter, the cut-off frequency being less than a half of a sub-channel bandwidth; determine nonlinear compensation coefficients for each sub-channel of the digital receive coherent optical signal based on the filtered intensity vectors; and modify the digital receive coherent optical signal based on the nonlinear compensation coefficients in accordance with the filtered intensity vectors to compensate for linear and nonlinear effects in an optical fiber.

Additional aspects of the present disclosure provide for a non-transitory computer readable medium with computer executable instructions stored thereon that, when executed by a processor, cause the processor to: receive a digital coherent optical signal comprising sub-channels; determine instantaneous values of intensity vectors for each sub-channel; determine values of filtered intensity vectors for each sub-channel by filtering the instantaneous values of the intensity vectors at frequencies lower than a cut-off frequency of a filter, the cut-off frequency being less than a half of a sub-channel bandwidth; determine nonlinear compensation coefficients for each sub-channel based on the filtered intensity vectors; and modify the digital coherent optical signal based on the nonlinear compensation coefficients determined based on the filtered intensity vectors.

Implementations of the present disclosure each have at least one of the above-mentioned object and aspects, but do not necessarily have all of them. It should be understood that some aspects of the present disclosure that have resulted from attempting to attain the above-mentioned object may not satisfy this object and may satisfy other objects not specifically recited herein.

One or both of additional and alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which.

Figure 1:
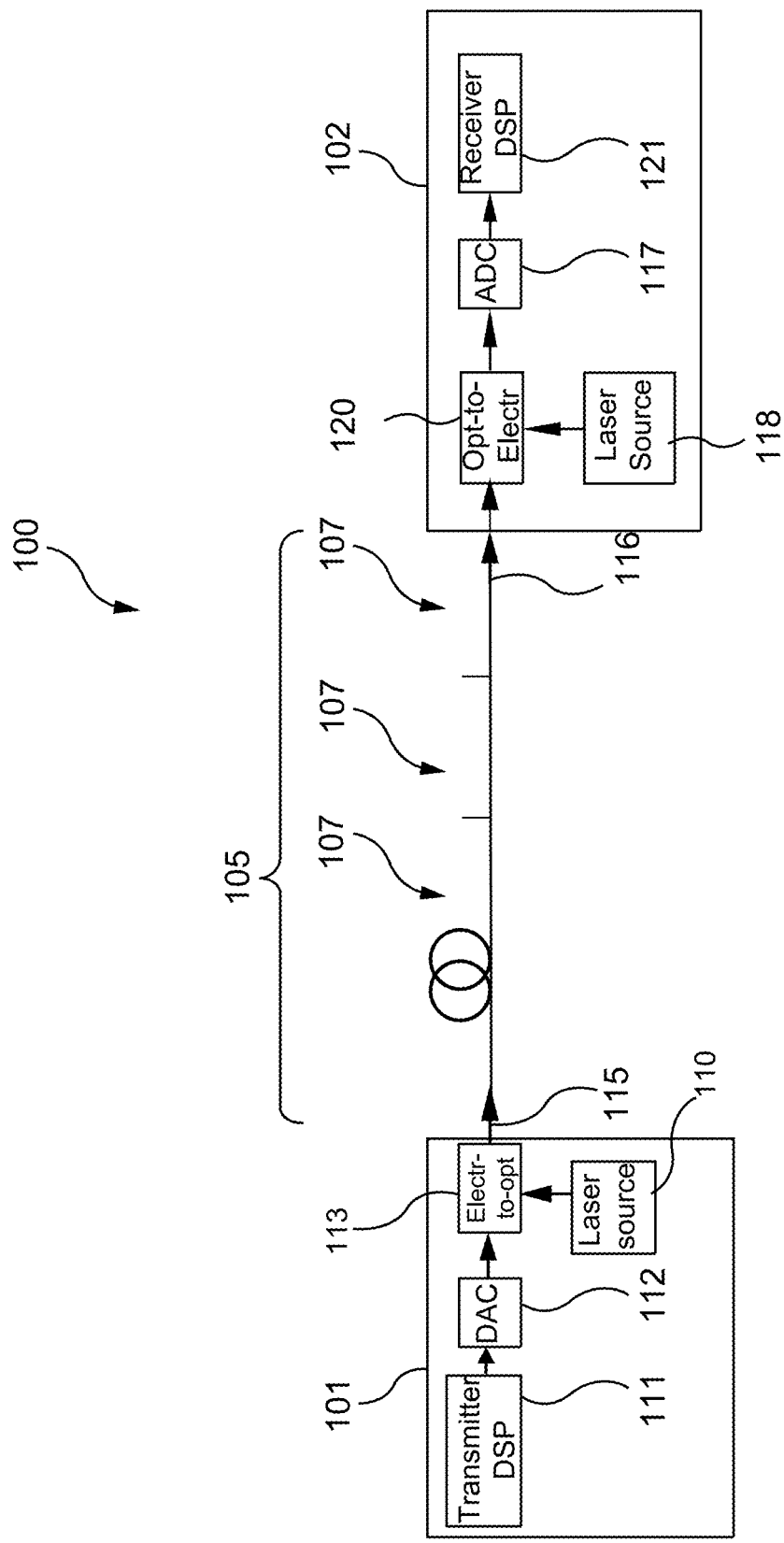
FIG. 1 depicts a block diagram of an optical link, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address deficiencies of the current state of the art. In particular, the instant disclosure describes systems, apparatuses and methods directed to providing nonlinear compensation to optical signal in coherent optical links.

As used herein, the term "about" or "approximately" refers to a +/−10% variation from the nominal value. It is to be understood that such a variation is always included in a given value provided herein, whether or not it is specifically referred to.

Throughout the present disclosure, the term "optical channel" refers to an optical signal that is carried in an optical link at a particular optical channel frequency. The optical channel has a frequency bandwidth. One optical channel may have one carrier. Alternatively, one optical channel may be composed of several carriers also referred to as "sub-channels" that are routed through the network as a single entity. Throughout the present disclosure, the term "superchannel" refers to an optical channel that binds multiple carriers (i.e., multiple sub-channels) for unified transmission through an optical network from the source to destination node.

It should be noted that the terms "correction" and "compensation" are used herein interchangeably with regards to correction of the nonlinear effects in an optical field or an optical signal.

Unless defined otherwise, all technical and scientific terms used herein have the same meaning as commonly understood by one of ordinary skill in the art to which this invention belongs.

FIG. 1 depicts an optical link 100 having a transmitter 101 and a receiver 102, in accordance with embodiments of technology described herein. It should be noted that the transmitter 101 at the signal source may be embodied within a transceiver, much as the receiver 102 may be embodied within a transceiver.

The transmitter 101 is configured to generate an optical channel signal (referred to herein as "generated optical signal 115"). The transmitter 101 includes a laser light source 110 configured to generate optical signals. The transmitter 101 also includes a transmitter processor 111, such as a customized digital signal processing (DSP) circuit implemented as an application specific integrated circuit (ASIC) or other suitable implementation platform. The transmitter 101 also includes a digital-to-analog converter (DAC) 112 and an electrical-to-optical converter 113. The generated optical signal 115 propagates through an optical fiber span 105, and is received at receiver 102.

The receiver 102 has an optical-to-electrical converter 120, such as a photodetector, which is configured to receive optical signals from optical fiber span 105. The receiver 102 receives a received optical signal 116. The receiver 102 also has a receiver processor 121, such as a receiver DSP circuit, implemented as ASIC or other suitable processing platform, an analog-to-digital conversion (ADC) 117 to convert the received optical signal 116 from analog form into a digital receive optical signal, and a laser source 118.

It is contemplated that transmitter 101 and receiver 102 may also incorporate other components such as, for example, digital-to-analog converters (DAC), drivers, and electro-optic (EO) modulators, not depicted in FIG. 1 for purposes of simplicity.

The optical signal (both generated optical signal 115 and received optical signal 116) may comprise a plurality of optical carriers or sub-channels. In some embodiments, the optical signal may comprise one or more superchannels. As noted above, each superchannel contains more than one carrier or sub-channel.

When propagating through optical fiber 105, the optical signal experiences one or both of linear and nonlinear impairments. The received optical signal 116 may be different from generated optical signal 115 due to such linear and nonlinear effects. The fiber nonlinear effects are proportional to an optical power density of the optical signal and may significantly affect the signal phase, pulse shape, and optical power evolution.

The primary nonlinear impairment of the optical signal in single carrier propagation is due to a self-phase modulation (SPM). SPM may be compensated, at least partially, at receiver 102 by a conventional digital back propagation (DBP) technique.

The conventional DBP technique permits correcting nonlinear effects by simulating virtual propagation of optical fields in optical fiber span 105 backwards from receiver 102 to transmitter 101 with fiber parameters having an opposite sign to a realistic propagation from transmitter 101 to receiver 102. Such simulation of the virtual propagation of optical fields backwards from receiver 102 to transmitter 101 is referred to as "backpropagation". Conventional DBP techniques operate by dividing the whole length of optical fiber span 105 into one or more sections 107. Each section 107 corresponds to one backpropagation step. The DBP technique involves finding solutions to Manakov equations for each section 107. For multi-carrier transmission, Manakov equations are individually solved for each separate carrier or sub-channel.

After solving the Manakov equations, conventional DBP technique operates to determine a correcting factor. The correcting factor is then applied to the received optical signal 116. The correcting factor is used to, at least partially, compensate for the nonlinear effects experienced during propagation over optical fiber span 105. However, the conventional DBP method performs poorly at higher baud rates or at lower number of backpropagation steps in optical fiber span 105.

Moreover, when propagating through optical fiber 105, the optical signal experiences not only SPM effects, but also cross-phase modulation (XPM) effects. XPM effects on a channel are associated with the optical signals transmitted in frequency adjacent channels. It should be understood that all neighboring channels may have a contribution to the XPM, but typically the immediately adjacent channel(s) will have the greatest contribution. The conventional DBP technique does not take into account XPM effects experienced by the optical signal during propagation in optical fiber span 105. Compensation for XPM, especially in the context of high baud rate multi-carrier systems, may allow for an improvement of the optical network.

A conventional coupled equation DBP (CE-DBP) technique has been described in Fernando Pedro Guiomar, et al., Multicarrier Digital Backpropagation for 400 G Optical Superchannels, Journal of Lightwave Technology, vol. 34, no. 8, Apr. 15, 2016.

In the conventional CE-DBP technique, a split-step Fourier method (SSFM) is used to simulate the backpropagation of the optical signal. In order to compensate for nonlinear effects that are experienced by the optical signal during propagation through optical fiber span 105, nonlinear phase angle correction coefficients are applied to intensity vectors of the optical signal. The CE-DBP technique uses a structure of a superchannel to simplify the processing for the nonlinear compensation. The CE-DBP technique uses coupling factors to account for contributions from neighboring carriers.

Figure 2:
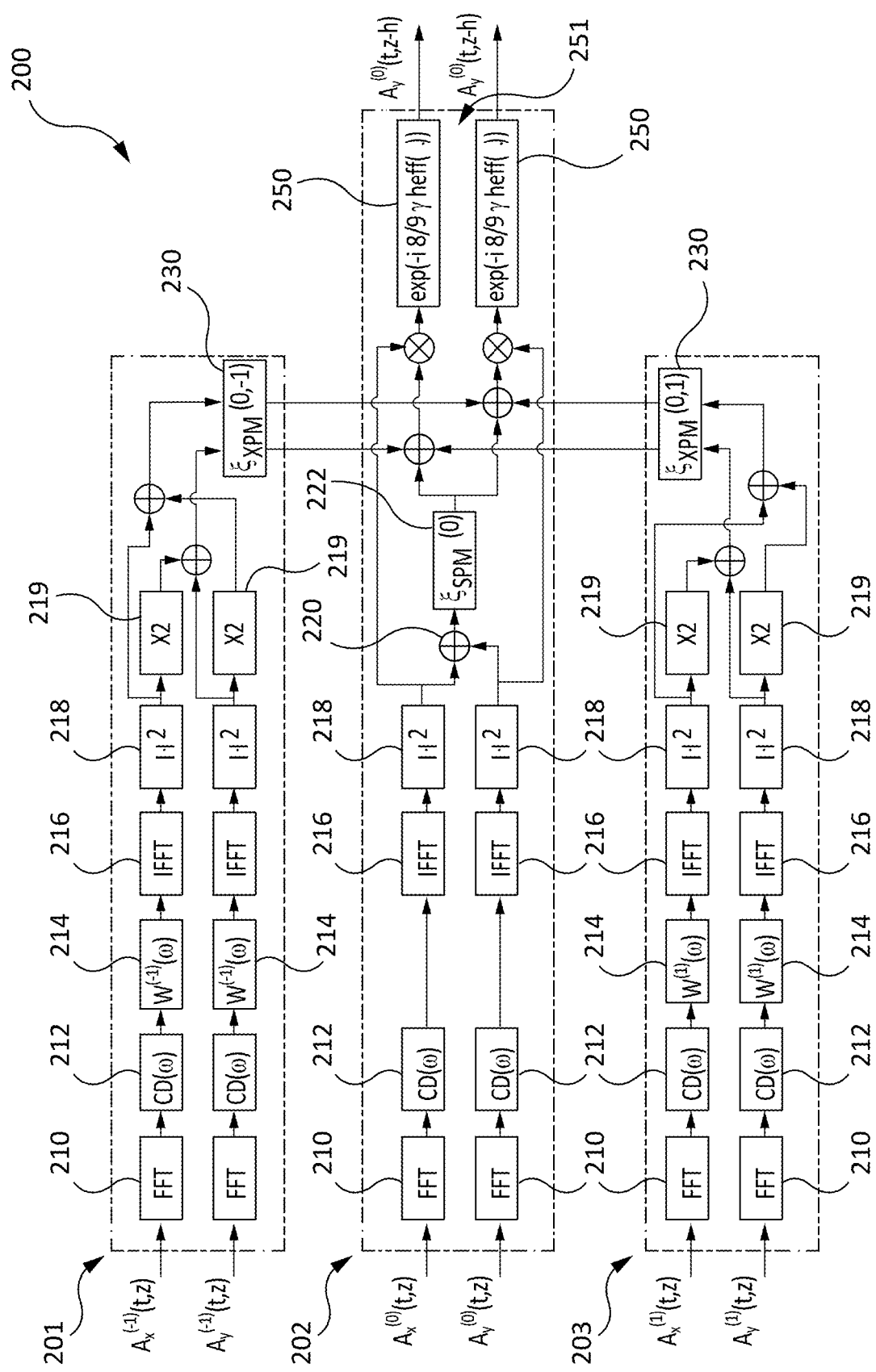
FIG. 2 (PRIOR ART) depicts a block diagram of numerical implementation of a single step of a conventional coupled equation digital back propagation (CE-DBP) technique.

FIG. 2 (PRIOR ART) depicts a block diagram of numerical implementation of a single step of the conventional CE-DBP technique. An input optical signal is composed of three carriers or sub-channels: a first carrier 201, a second carrier 202, and a third carrier 203. For simplicity, only a compensation of nonlinear effects for second carrier 202 is illustrated in detail.

The Manakov equation for a variation of dual polarized optical field $A_{x/y}$ of one carrier (sub-channel) over a section 107 ($\partial z$) of optical fiber 105 may be written as follows:

$$-\frac{\partial A_{x/y}}{\partial z} = \frac{\alpha}{2}A_{x/y} + i\frac{\beta_2}{2}\frac{\partial^2 A_{x/y}}{\partial t^2} - i\frac{8}{9}\gamma(|A_x|^2 + |A_y|^2)A_{x/y}, \quad (1)$$

where $\alpha$ is a fiber attenuation, $\beta_2$ is a group velocity dispersion and $\gamma$ is Kerr nonlinearity parameter.

As depicted in FIG. 2, each carrier (sub-channel) has an optical field with an x-component $A_x$ and a y-component $A_y$. Both x-component $A_x$ and y-component $A_y$ of the optical field are represented by complex variables. In equation (1), the imaginary component of the complex variable is denoted with imaginary number i.

The Manakov equation (1) can be solved for $N_{ch}$ independent carriers (sub-channels), so that the optical field can be written as follows:

$$A_{x/y} = \sum_{m=-(N_{ch}-1)/2}^{(N_{ch}-1)/2} A_{x/y}^{(m)} \exp(-im\Delta\omega t), \quad (2)$$

where $$A_{x/y}^{(m)}$$

is the optical field component in x or y direction for m-th carrier.

In equation (2), $$A_{x/y}^{(m)}$$

corresponds to carrier index m. $\Delta\omega$ is a spacing between two neighboring carriers (so-called inter-carrier spacing). Time is denoted by t.

Ignoring inter-carrier coherent terms, one may obtain the following system of coupled equations:

$$-\frac{\partial A_{x/y}^{(m)}}{\partial z} = \quad (3)$$

$$\frac{\alpha}{2}A_{x/y}^{(m)} + m\beta_2\Delta\omega\frac{\partial A_{x/y}^{(m)}}{\partial t} + i\frac{\beta_2}{2}\frac{\partial^2 A_{x/y}^{(m)}}{\partial t^2} - i\frac{8}{9}\gamma(C_{SPM}^{(m)} + C_{XPM,x/y}^{(m,q)})A_{x/y}^{(m)},$$

where SPM and XPM terms responsible for SPM and XPM effects are:

$$C_{SPM}^{(m)} = \xi_{SPM}^{(m)}(|A_x^{(m)}|^2 + |A_y^{(m)}|^2), \quad (4)$$

$$C_{XPM}^{(m,q)} = \sum_{\forall q \neq m} \xi_{XPM}^{(m,q)}(2|A_{x/y}^{(q)}|^2 + |A_{y/x}^{(q)}|^2). \quad (5)$$

In equations (3)-(5), $$\xi_{SPM}^{(m)}$$

and $$\xi_{XPM}^{(m,q)}$$

are so-called SPM and XPM "free parameters" and $$m\beta_2 \Delta\omega \frac{\partial A_{x/y}^{(m)}}{\partial t}$$

is a walk-off between sub-channels. The free parameters may be also referred to as "adaptation parameters". As such, SPM free parameter may be also referred to as "SPM adaptation parameter", and XPM free parameter may be also referred to as "XPM adaptation parameter".

Each carrier (or sub-channel in a superchannel) can be treated separately with correction terms used to compensate for the impact of XPM. In some embodiments, the XPM associated with a first carrier is independent of the XPM in another channel of the superchannel. To implement CE-DBP technique, receiver 102 needs to use digital multipliers and adders for each superchannel carrier to compensate for the impairment due to XPM. In CE-DBP technique, each carrier (sub-channel) in the superchannel is treated independently using a dedicated DSP circuit.

In FIG. 2, first carrier 201 is denoted as m=−1, second carrier 202 as m=0, and third carrier 203 as m=1. In blocks 210, at least a part of the linear distortion is corrected for each carrier 201, 202, 203 in the frequency domain. Then, the SPM contribution to the nonlinear phase change is determined for each carrier 201, 202, 203 in the time domain. It will be understood that the phase change is at least partially attributable to non-linear behaviors in the channel, and is thus referred to as a non-linear phase change. After the SPM contribution has been determined for each separate carrier, XPM contributions to the other carriers in the superchannel are determined.

All XPM contributions from the neighboring carriers are then combined with the determined SPM contribution for the carrier (e.g. second carrier 202) to form an overall nonlinear phase compensation coefficient 250. The nonlinear phase compensation coefficient 250 is applied to x and y components of the carrier optical field to obtain corrected optical field $$A_{x/y}^{(m)}(t, z-h)$$

251, where h is the section length of the backpropagation step.

At each backpropagation step, the receiver processor 121 determines an optical field propagated backwards through a single section 107 for all carriers. The receiver processor 121 can then determine a compensation for both the chromatic dispersion (CD) (which is often linear) as well as nonlinear impairments. This determination can be performed sequentially for each of the segments 107 so that an overall compensation for the cumulative impairments can be determined and applied.

It will be appreciated that, for purposes of simplicity, FIG. 2 only depicts the impact of first sub-channel 201 (m=−1) and third sub-channel 203 (m=1) on second sub-channel 202 (m=0).

An FFT is applied to each component of a sub-channel in block 210. This generates a frequency domain representation of the components of the sub-channels in each of receive chains 201 202 and 203. Compensation for chromatic dispersion on each of the frequency domain representations of the sub-channel components can be applied in CD 212. Compensation for the walk-off effect (W(ω)) can then be applied in block 214.

The walk-off effect compensated signal components can be returned to time domain representations through the application of an inverse FFT (IFFT) in blocks 216. In block 218 values of the intensity vector associated with the channel are determined. The values of the intensity vector are then scaled (in this example they are multiplied by 2) in blocks 219. At block 222, the intensity vectors are scaled by an SPM free parameter $\xi_{SPM}$. At blocks 230, the intensity vectors are scaled by an XPM free parameter $\xi_{SPM}$.

The conventional CE-DBP technique, as illustrated in FIG. 2, uses amplitudes and intensities of the received optical signal in all available frequencies. However, the conventional CE-DBP technique becomes less effective at higher baud rates or with longer backpropagation steps. This reduction in the effectiveness has to be considered in conjunction with an increase the computational complexity increase of using shorter backpropagation steps.

An enhanced coupled equation DBP (ECE-DBP) technique will be described below, and is an improvement over the conventional CE-DBP technique. In some embodiments, one or both of an improvement to the overall performance and a reduction in the computational complexity of the implementation may be found.

In order to compensate for nonlinear effects experienced by the optical signal during propagation through a coherent optical link 100, the ECE-DBP technique disclosed below applies nonlinear compensation coefficients to intensity vectors of the optical signal. The ECE-DBP technique uses low-frequency components of the intensity vector for each carrier in order to determine the nonlinear compensation coefficients (also referred to herein as "nonlinear phase compensation coefficients"). In some embodiments, only low-frequency components are considered.

In at least one embodiment of the present disclosure, the values of the intensity vectors are determined for components of the optical signal having frequencies lower than a cut-off frequency. Such values of the intensity vectors are used to determine the nonlinear phase angles compensation coefficients. In some embodiments, the cut-off frequency is applied through the use of a low-pass filter, which in some embodiments may be a Gaussian filter.

To determine the values of low-frequency components of intensity vector for each carrier, an SPM filter having an SPM filter coefficient is applied to the determined intensity vector. Similarly, XPM filters, each having a corresponding XPM filter coefficient, are applied to the intensity vector. A technique for optimization of SPM filters and XPM filters is also described herein below.

The use of low-pass filtered intensity amplitudes for calculating SPM and XPM nonlinear compensation coefficients permits averaging over neighboring symbols. This averaging can improves estimation of the nonlinear phase angle contribution to one or both of intra- and inter-carrier interference. Moreover, the use of the low-pass filtered intensity amplitudes for calculating SPM and XPM nonlinear compensation coefficients in the ECE-DBP technique can result in a low correlation effect for widely spaced sub-channels.

The ECE-DBP technique described herein provides for a method and implementable apparatus for compensating for non-linear phase noise in high baud rate superchannels attributable to one or both of SPM and XPM.

In the embodiments described herein, filtering the higher frequency components of the intensity vectors is performed to allow for an improved estimation of the relevant nonlinear phase angle for each carrier. By filtering the intensity vectors when determining compensation values within each backpropagation step, the estimation accuracy of the nonlinear phase angles can be improved.

The ECE-DBP technique as described herein can be used in channels supporting higher baud rates (baud rates higher than 32 Gigabaud), with a relatively low number of backpropagation steps, and longer sections 107 of optical fiber spans 105. Moreover, the ECE-DBP technique as described herein may be particularly beneficial for transmission of optical signals with high order modulation (such as, for example, 16 QAM and higher) over long distances of optical fiber, and in particular, for superchannel transmission.

Figure 3:
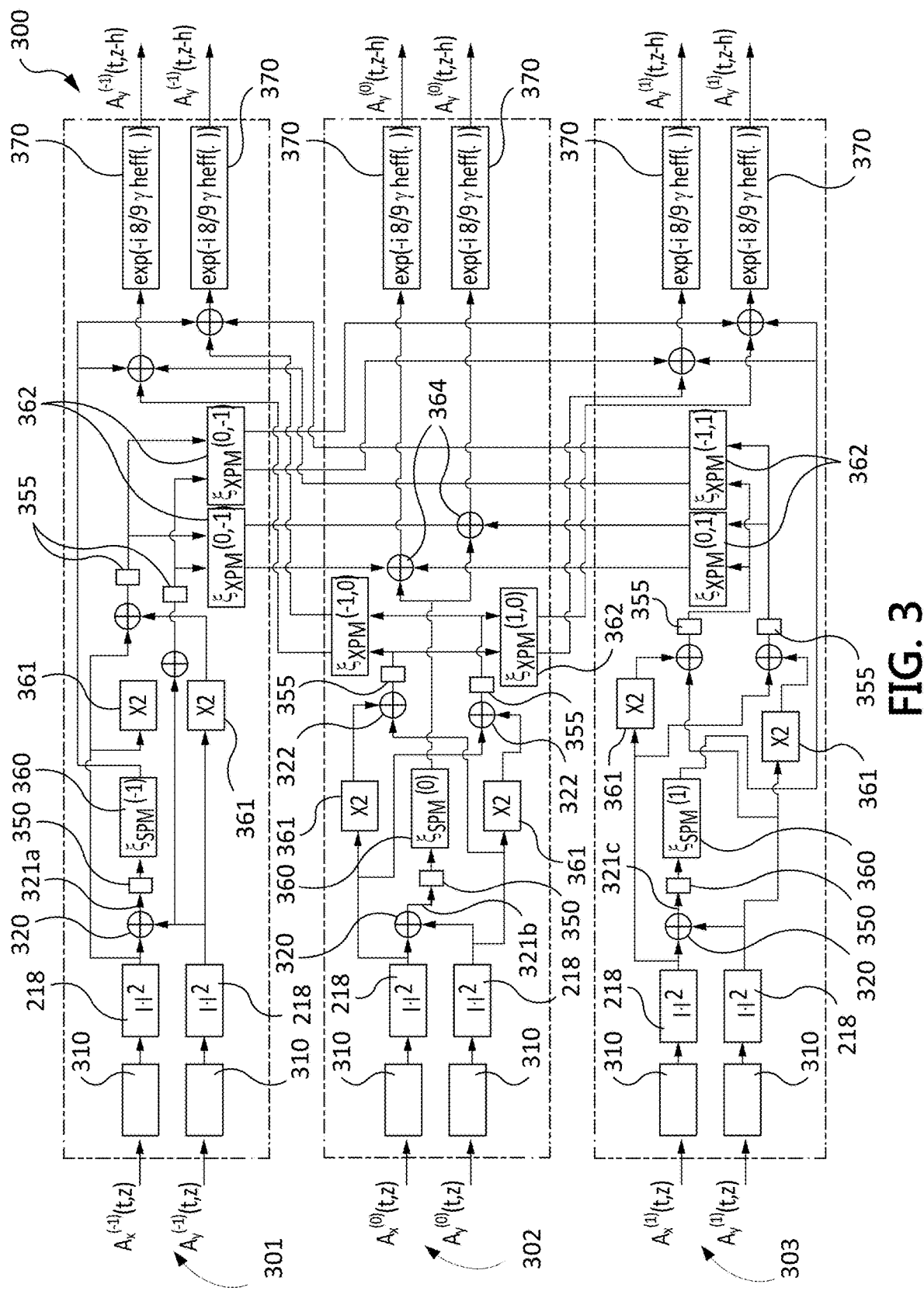
FIG. 3 depicts a block diagram of a method for signal processing of a digital backpropagation step of an enhanced coupled equation digital back propagation (ECE-DBP) technique, in accordance with various embodiments of the present disclosure.

FIG. 3 depicts a block diagram of the logical blocks of a receiver 300 for carrying out a method of signal processing during a backpropagation step of ECE-DBP technique, in accordance with at least one embodiment. An input signal received by receiver 300 comprises three carriers: first carrier 301, second carrier 302, and third carrier 303. Each of the received carrier signals 301, 302 and 303 is represented having both X- and Y-components. It should be understood that in the current discussion, the X and Y components are representative of amplitude values of the signal in the respective fixed axes. As can be seen in FIG. 3, first carrier 301 is an immediately neighboring carrier to second carrier 302. The input signal received by receiver 300 is also referred to herein as a "coherent optical signal" or a "coherent optical WDM signal".

Similar to FIG. 2, FIG. 3 is a simplified block diagram depicting a receiver architecture for compensating for at least part of the nonlinear impact of the first carrier 301 (m=−1) and the third carrier 303 (m=1) on the second carrier 302 (m=0). It should be understood that carriers 301, 302, 303 may be individual carriers of one optical channel or may be sub-channels of a superchannel. It should also be understood that the second carrier has a nonlinear impact on both of its immediately neighboring carriers. The first and third carriers, though not immediately frequency adjacent also have an impact on each other that can be determined and at least partially compensated for. As a carrier is further spaced apart from another carrier, its contribution to the nonlinear effects experienced by the given carrier. In some implementations, not all the carriers need to be considered in determining the nonlinear compensation values to limit the computational and implementation complexity.

Implementation of linear correction involving FFT to transform the received signal of each sub-channel into the frequency domain at blocks 210, compensating for CD at blocks 212, and conversion back to time domain with IFFT at blocks 216 have been described above and is denoted in FIG. 3 as block 310. Using the output of 310, the values of the elements within the intensity vectors can be determined, using time domain representations, in blocks 218.

Values of elements of the intensity vectors $I_{SPM}$ associated with the SPM contribution are determined by adding squared amplitudes of x-polarization optical field $A_x$ and y-polarization optical field $A_y$:

$$I_{SPM} = \text{ABS}(A_x)^2 + \text{ABS}(A_y)^2. \quad (6)$$

This can be performed in adder 320, and provides the resulting $I_{SPM}$ 321a-c.

Having used the X and Y components of the input signal to determine an $I_{SPM}$ value, they will now be used in determining the contribution that the carrier has on its neighbouring carrier, X- and Y-components of intensity vectors $I_{XPM}$ for XPM contribution to the neighboring carriers are determined as follows:

$$I_{XPM\_x} = 2 \cdot \text{ABS}(A_x)^2 + \text{ABS}(A_y)^2, \quad (7)$$

$$I_{XPM\_y} = \text{ABS}(A_x)^2 + 2 \cdot \text{ABS}(A_y)^2. \quad (8)$$

Multipliers 361 and adders 322 can make use of the intensity vector output by 218 as illustrated in FIG. 3 to arrive at these values.

In at least one embodiment, the values of intensity vectors $I_{SPM}$, $I_{XPM}$ are "instantaneous" values of the intensity vectors $I_{SPM}$, $I_{XPM}$. The instantaneous values of the intensity vectors $I_{SPM}$, $I_{XPM}$ are determined from instantaneous values of the received input signal. In other words, the received coherent optical signal is measured instantaneously, without averaging over any time period.

SPM intensity vectors $I_{SPM}$ for first 301, second 302, and third 303 carriers are filtered by corresponding SPM filters 350. XPM intensity vectors $I_{XPM\_x}$, $I_{XPM\_y}$ are filtered by corresponding XPM filters 355.

Figure 4:
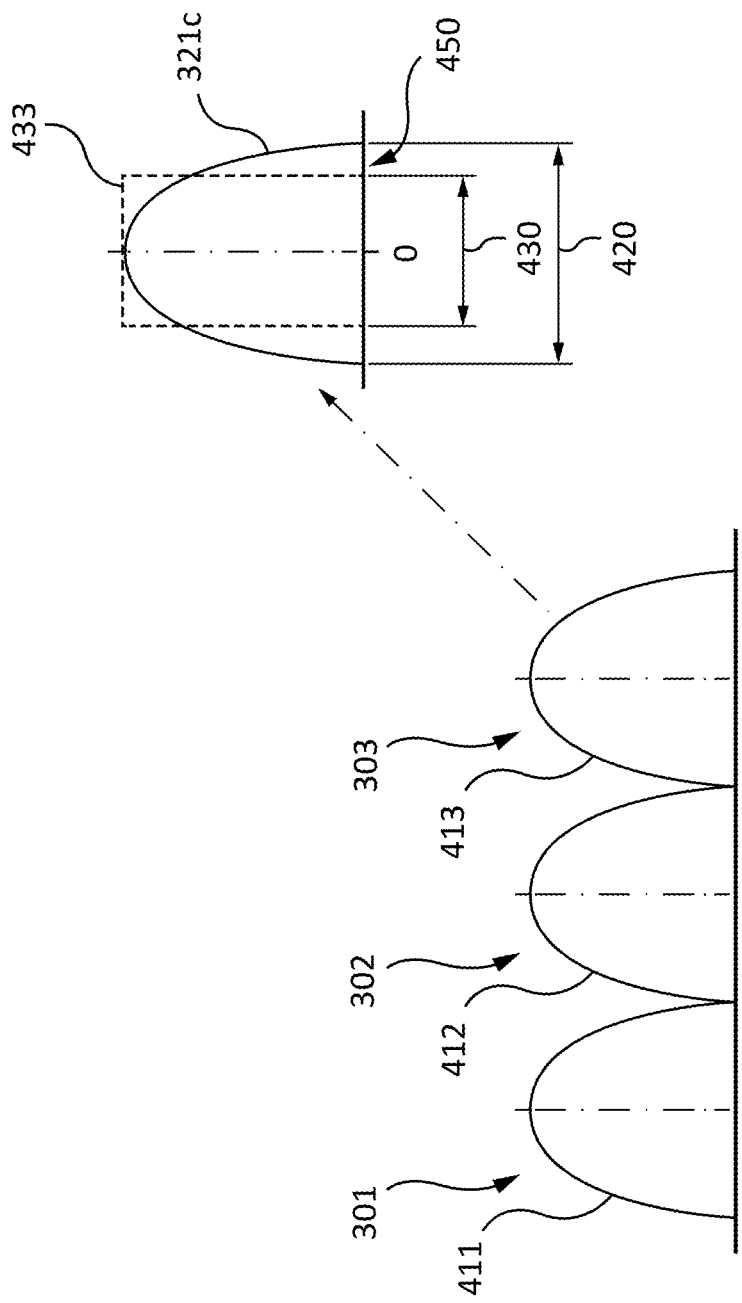
FIG. 4 illustrates a portion of a spectrum of an optical signal, in accordance with at least one embodiment of the instant disclosure.

FIG. 4 illustrates a portion of a spectrum of the optical signal having three carriers (sub-channels) 301, 302, 303. The call out of sub-channel 303 will be used in conjunction with the discussion of FIG. 3 to further illustrate embodiments of the methods of compensation for nonlinear impairments. Carriers 301, 302, 303 occupy frequency sub-bands 411, 412, 413.

Referring both to FIG. 3 and FIG. 4, values of SPM intensity vectors $I_{SPM}$ (depicted in FIG. 3 as 321a, 321b, 321c) are filtered by corresponding filters at blocks 350 to determine values of filtered SPM intensity vectors for each carrier 301, 302, 303.

FIG. 4 provides a view of aspects of the application of SPM filtering. Channel 303 is composed of both X and Y components, and the SPM filter may also make use of X and Y components. Filter 321c is a projection of both the combination of the X and Y components on a single plane. Filter 321c can receive signals having carrier bandwidth 420 that in some embodiments roughly corresponds to the bandwidth of sub-band 413. Filter 321c has a filter bandwidth 430 that restricts the bandwidth of the sub-band 413 to a filter sub-band 433. The filter bandwidth 430 is less than the carrier bandwidth 420. It should be understood that FIG. 4 is provided only to illustrate one example of processing for one sub-channel with an SPM filter at block 350. The filter bandwidth 430 is only representative of the actually applied filter bandwidths as they are optimized based on transmission scenario. Moreover, as described below, an XPM filter bandwidth also depends on neighboring sub-channel's signals.

Applying a filter 350 to SPM intensity vector $I_{SPM}$ 321c provides values of SPM intensity vectors $I_{SPM}$ over filter sub-band 433. Thus the SPM intensity vectors $I_{SPM}$ that is incident to block 360 has frequencies lower than a cut-off frequency 450 of the corresponding filter 433.

Referring again to FIG. 3, at blocks 355, the XPM filter is applied to XPM intensity vectors $I_{XPM}$ to generate values of the filtered XPM intensity vectors. It should be understood that the XPM intensity values computed within a given channel are not necessarily needed for processing the signal received in the given channel, and instead are provided to the frequency adjacent channels in the superchannel. As shown in FIG. 3, the XPM vectors are provided to both the immediately adjacent as well as the other channels in the superchannel.

The SPM and XPM filters applied to the intensity vectors at blocks 350 and 355 have SPM and XPM filter coefficients, Hf_SPM and Hf_XPM, respectively. The SPM and XPM filter coefficients Hf_SPM and Hf_XPM may be determined by a method of filter parameters selection as described herein below.

In scaling block 360, the filtered SPM intensity vectors are multiplied by a corresponding SPM free parameter $\xi_{SPM}$ to obtain a scaled SPM intensity vector. In some embodiments, the scaling factor applied for a given channel is also used in all the other channels. In scaling block 362, XPM intensity vectors are multiplied by a corresponding XPM free parameter $\xi_{SPM}$ to obtain a scaled XPM intensity vector. As with the SPM scaling factor above, in some embodiments the XPM scaling factor applied in a given channel is the same scaling factor used in all channels. The SPM and XPM scaling factors need not be related to each other. At blocks 364, the filtered and scaled SPM intensity vectors are combined with the filtered and scaled XPM intensity vectors of the neighboring carriers (for example, first carrier 301 and third carrier 303).

A nonlinear compensation coefficient for a particular carrier may be represented as:

$$-\frac{i8}{9}\gamma h_{eff}\left(\xi_{SPM} I_{SPM} + \sum \xi_{XPM} I_{XPMx/y}\right), \quad (9)$$

where γ is a nonlinearity parameter of optical fiber span 105, and $h_{eff}=(1-e^{-\alpha h})/\alpha$ is the effective length of the backpropagation step.

The nonlinear compensation coefficients are applied to the corresponding x and y-polarization optical field symbols in block 370. The optical field symbols have already been CD compensated in CD compensation block 212. In particular, optical field symbols are multiplied by:

$$\exp\left(-\frac{i8}{9}\gamma h_{eff}\left(\xi_{SPM} I_{SPM} + \sum \xi_{XPM} I_{XPMx/y}\right)\right) \quad (10)$$

In other terms, the optical field symbols of the digital coherent optical signal is multiplied by the expression provided in equation (10).

The task block 370 completes one backpropagation step in the backpropagation processing in ECE-DBP technique.

Referring both to FIG. 2 and FIG. 3, the values of nonlinear phase compensation coefficient 250 in CE-DBP technique and nonlinear compensation coefficients 370 in ECE-DBP technique are distinctly different because the intensity vectors in ECE-DBP are filtered at blocks 350 and 355.

Referring also to FIG. 1, in some embodiments, the backpropagation process is repeated N times to compensate for the nonlinearities in each of the N sections 107 in the entire length of optical link 105. The number of iterations of the backpropagation process depends on the number of segments 107 that entire length of optical link 105 is divided into as well as and the length of each section 107. In some embodiments, each segment 107 is the same length.

Figure 5:
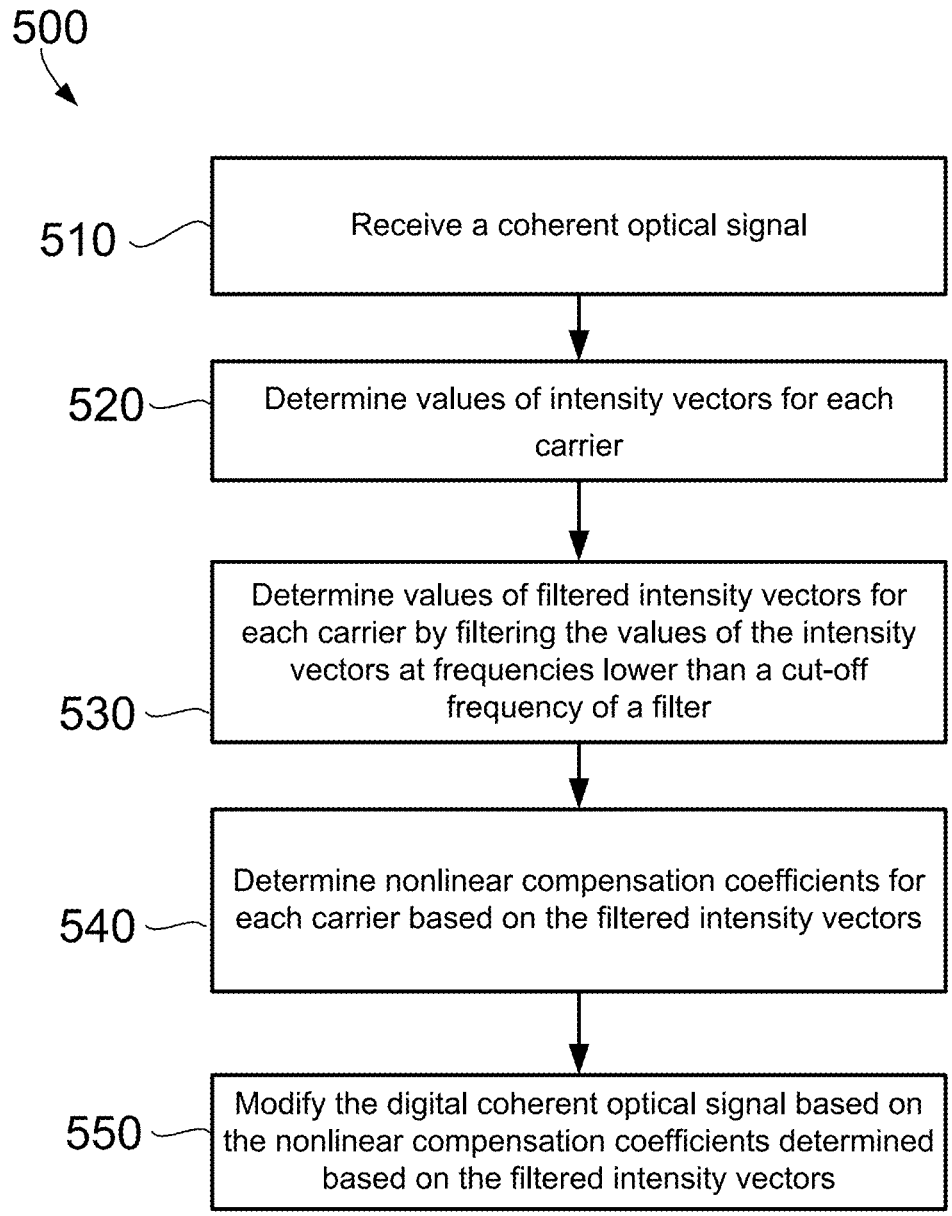
FIG. 5 depicts a flowchart illustrating a method for compensation for linear and nonlinear effects in optical fiber of a coherent optical signal transmitted through an optical link, in accordance with embodiments of technology described herein.

FIG. 5 depicts a flowchart illustrating a method for compensation for linear and nonlinear effects in optical fiber of a coherent optical signal transmitted through an optical link, in accordance with embodiments of technology described herein. At step 510, a coherent optical signal is received by a receiver 102 and may be processed by receiver processor 121. The received coherent optical signal may comprise carriers over carrier frequency sub-bands, and each carrier frequency sub-band has a finite bandwidth. The received coherent optical signal is then digitized, by for example, (ADC) 117 to convert the received optical signal 116 from analog form into a digital receive coherent optical signal.

At step 520, elements of the intensity vectors corresponding to the received optical signal are determined. This may be performed by receiver processor 121 over a number of carrier frequency sub-bands.

At step 530, the intensity vector for each carrier is filtered. The filtering is applied to filter out frequencies lower than cut-off frequency 450 of the filter. The cut-off frequency 450 of the filter is less than carrier bandwidth 420. At step 540, nonlinear compensation coefficients for each carrier are determined based on the filtered intensity vectors. The digital coherent optical signal can then be modified in accordance with the determined nonlinear compensation coefficients. As will be understood by those skilled in the art, these steps can be carried out in receiver processor 121.

Figure 6:
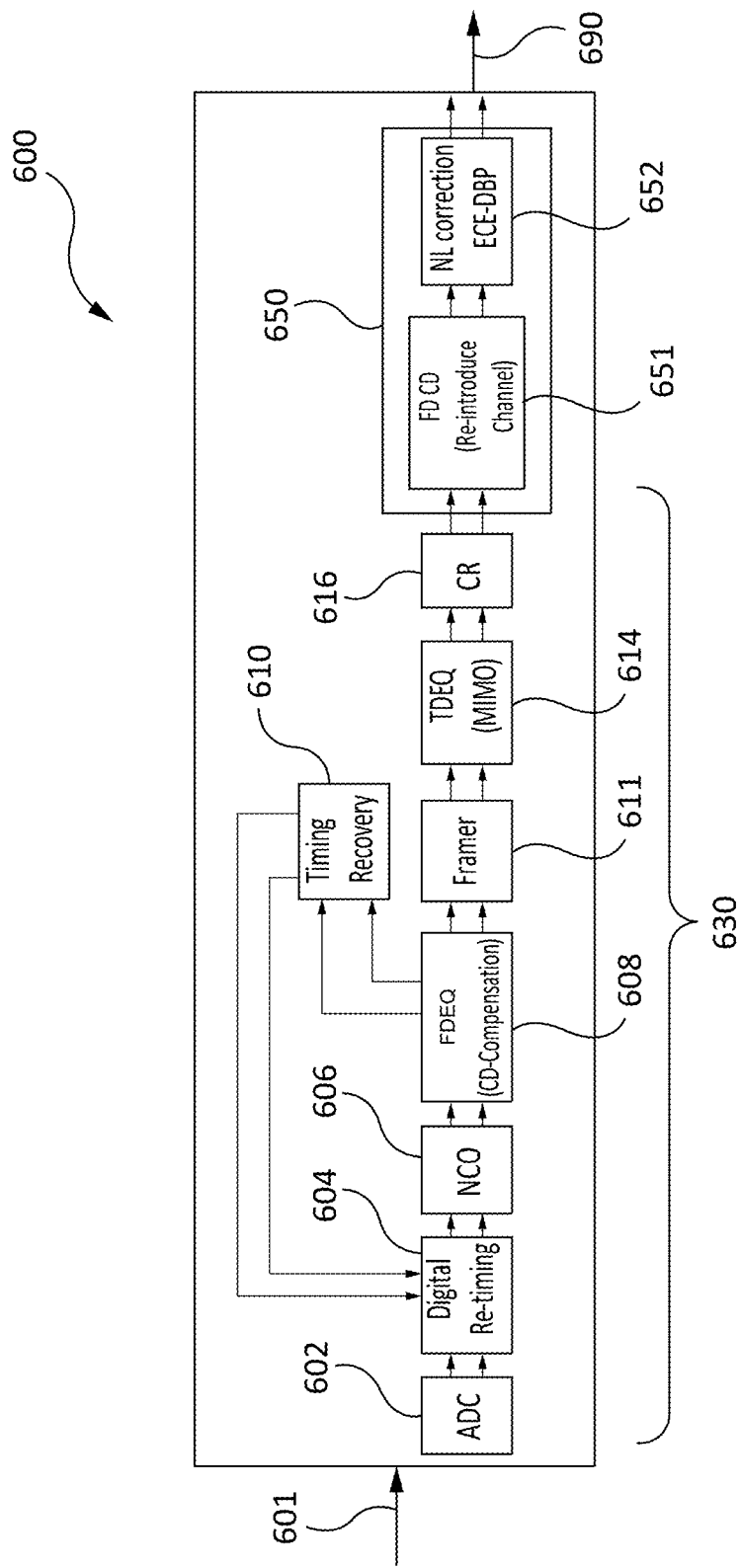
FIG. 6 depicts a block diagram of a method for signal processing of a signal received by an optical receiver, in accordance with at least one embodiment of the instant disclosure.

FIG. 6 depicts a functional block diagram of a signal processor 600 for processing the signal received by optical receiver 102, in accordance with at least one embodiment of the instant disclosure.

The optical-to-electrical converter 120 of optical receiver 102 receives a coherent optical signal. This received coherent optical signal is an analogue signal, and is delivered to analog-to-digital converter (ADC) 602. Conventional processing functions 630 which compensate for at least a part of the linear effects in the fiber are first used to process the data symbols of the coherent optical signal. It will be understood that variations in the processes and functions carried out in 630 do not necessarily have an impact on the other parts of the process. Conventional signal processing functions 630 comprise ADC 602, digital re-timer 604, a numerically controlled oscillator (NCO) 606, frequency domain equalizer (FDEQ) 608, and timing recovery function 610.

Framer 611 is used to determine the starting boundary of a frame of the signal using correlation properties of the signal. The signal processing chain may also comprise a time domain equalizer (TDEQ) 614 configured to perform finite impulse response (FIR) MIMO equalization, and a carrier recovery (CR) block 616. These functions provide compensation of linear effects in optical fiber and are generally well known.

In the conventional methods of coherent optical signal recovery, the FDEQ block is used to compensate the signal for linear impairments in the optical link, including the chromatic dispersion. FDEQ block 608 may be used to determine and compensate for the chromatic dispersion of the signal.

In accordance with at least one embodiment of the present disclosure, nonlinear compensation may be implemented in a nonlinear compensator 650 after FDEQ block 608 which compensate for linear effects of the channel.

After the compensation for the linear effects, the symbols may be processed using the ECE-DBP technique to compensate for the effects of the nonlinearities of the channel that are present in the signals. In some embodiments, the chromatic dispersion has already been corrected at block 608 when compensating for linear effects. In at least one embodiment depicted in FIG. 6, the chromatic dispersion is reintroduced at block 651 in the signals before the ECE-DBP method 300 is applied at block 652. In ECE-DBP processor 652, compensation for the effects of nonlinearities in the optical channel are applied in the manner discussed above.

The design, implementation and operation of nonlinear compensator 650 may be simplified and made more efficient or effective because it does not need to address the linear effects on the signal which have been addressed by processing chain 630. Typically, the input signal to nonlinear compensator 650 has been at least partially corrected to remove or mitigate PMD and CD impairments. Nonlinear compensator 650 may be implemented using a variety of processors including a Digital Signal Processor (DSP), which may also be used to handle the linear compensation chain 630. The implementation of the signal processor 600 may be simplified due to the use of a lower sampling rate.

Figure 7:
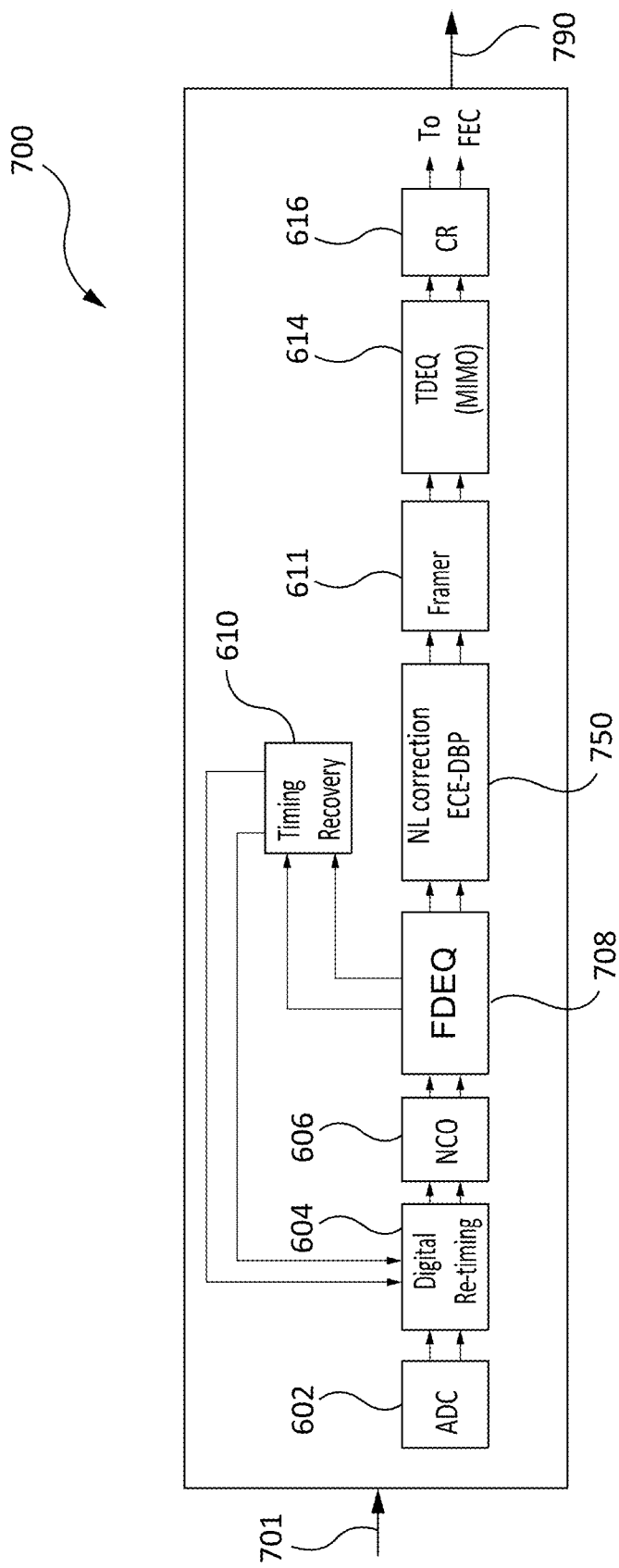
FIG. 7 depicts a block diagram of another embodiment of the method for signal processing of a signal received by the optical receiver.

FIG. 7 depicts a block diagram of a signal processor 700 to be implemented within (or in conjunction with) optical receiver 102, in accordance with embodiments of technology described herein. Blocks 602, 604, 606, 610, 611, 614 and 616 are configured to operate in manner similar to corresponding blocks of FIG. 6 that been described above. In the embodiment depicted in FIG. 7, nonlinear compensator 750 receives and acts upon the output of a modified FDEQ 708. In such modified FDEQ 708, the correction vector associated with chromatic dispersion is removed from the processing. It will be well understood that in such embodiments the FDEQ 708 can be implemented in a manner that does not apply any correction for chromatic dispersion.

The nonlinear compensator 750 provides CD compensation along with nonlinear compensation. Instead of FDEQ block compensating for CD, the CD compensation is performed directly at block 750. Thus, CD does not need to be reintroduced in this embodiment. In the embodiment depicted in FIG. 7, no additional FFT and IFFT processors or processing units are required in order to re-apply CD to the signals. The sampling rate in the processing chain may be higher, which may improve the estimation of the nonlinear angles. The signal processor 700, depicted in FIG. 7, may provide improved results associated with the multi-tap treatment of CD compensation. Using smaller sized FFT reduces the implementation complexity.

In various embodiments, SPM and XPM filters applied at blocks 350 and 355, respectively, may be low-pass filters. In some embodiments, the low-pass filter may have a Gaussian shape (so-called "Gaussian low-pass filters") and may be characterized by 3 dB filter bandwidth.

The values of the filter bandwidths of SPM and XPM filters are free parameters. The filter bandwidths may be selected based on the superchannel characteristics.

The Gaussian low-pass filter may be applied in order to limit the bandwidth of the intensity waveform. The output of the filter is used to determine the nonlinear phase correction which is then applied to the data symbols. The frequency response of the Gaussian low-pass filter is:

$$H(f) = \exp\left(\frac{-f^2}{2\sigma^2}\right), \tag{11}$$

where $BW_{3dB} = \sqrt{2\ln(2)}\sigma$ is the 3 dB filter bandwidth.

When all carriers have the same baud rate and are equally spaced, all SPM filters may have the same filter coefficients. For XPM compensation, separate XPM filters are applied to X and Y polarizations of the intensity vector. In at least one embodiment, these XPM filters have the same filter parameters. Each XPM filter is applied to sampled data from respective polarization. Similarly to SPM filters, all XPM filters may also have the same filter parameters. SPM filter and XPM filter may have different bandwidths.

It is contemplated that filters may employ delay elements and the signal has a multiplicative coefficient with which a delayed signal sample can be multiplied and summed with other (similar (delayed)) signal samples, that are multiplied by other coefficients. The filter coefficients are related to the overall target transfer function for the filter.

The filter parameters may depend on the optical signal bandwidth. In some embodiments, the filter parameters depend only on the signal bandwidth. A unique set of filter coefficients, SPM filter coefficient Hf_SPM and XPM filter coefficient Hf_XPM, may be determined by the receiver processor 121 for a given bandwidth.

The SPM filter bandwidth, XPM filter bandwidth, and the SPM free parameter $\xi_{SPM}$ and the XPM free parameter $\xi_{XPM}$ may be selected. The SPM filter bandwidth may be selected independently from the XPM filter bandwidth.

The method 800 is configured to determine the free parameters by minimizing a bit error rate (BER). With reference also to FIGS. 6 and 7, BER is determined after having processing in signal processors 600 or 700. When signal processor 600 is implemented, BER may be determined for optical field symbols 601. The output backpropagated optical field 690 can have linear and nonlinear effects compensated for by signal processor 600. When signal processor 700 is implemented, BER may be determined for optical field symbols 701. The output backpropagated optical field 790 can have linear and nonlinear effects compensated for by signal processor 700.

In at least one embodiment, the system changes SPM and XPM free parameters $\xi_{SPM}$, $\xi_{XPM}$ within a corresponding parameter range in order to find a corresponding minimum BER. The free parameter's value for this minimum BER is retained and used in the process of finding a minimum for the next free parameter.

In at least one embodiment, the system may first determine SPM parameters that provide the lowest BER. Then, the receiver processor 121 may determine XPM parameters that provide the lowest BER. Determining the SPM parameters first and the XPM parameters afterwards may provide the fastest convergence to the most optimal values of the free parameters.

Figure 8:
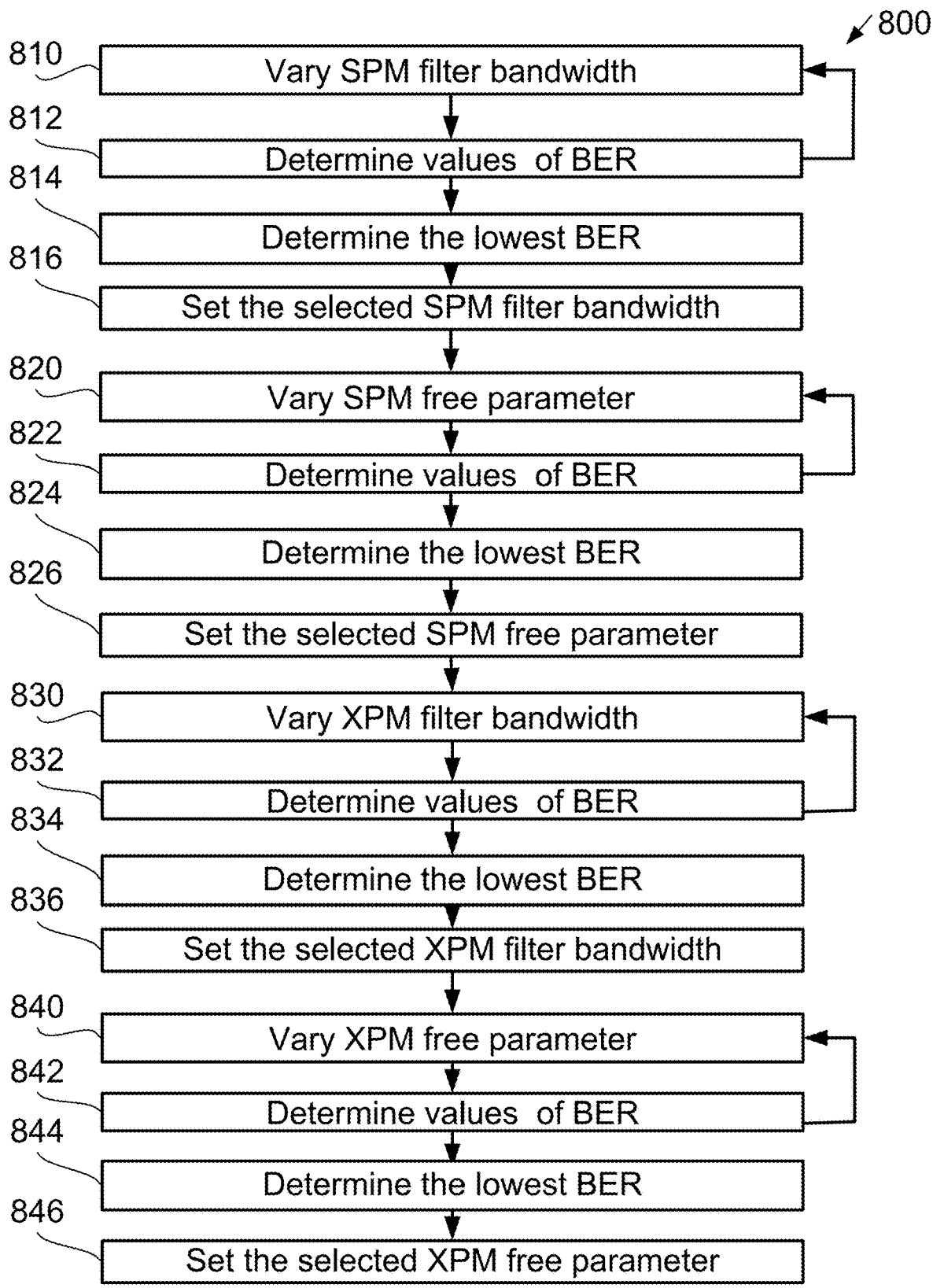
FIG. 8 depicts a flow chart of a method of digital processing in order to select the SPM and XPM free parameters, in accordance with embodiments of technology described herein.

FIG. 8 is a flow chart of a method 800 of determining the SPM and XPM free parameters, in accordance with embodiments of technology described herein.

The filtered intensity vectors for each carrier may be determined based on a self-phase modulation (SPM) filter and cross-phase modulation (XPM) filter. The nonlinear compensation coefficients may be determined based on a selected SPM free parameter, a selected XPM free parameter, a selected SPM filter bandwidth of the SPM filter, and a selected XPM filter bandwidth of the XPM filter. The selected SPM filter bandwidth and the selected SPM free parameter may be determined by steps of method 800 depicted in FIG. 8.

At steps 810, 812, for each SPM filter bandwidth within a range of SPM filter bandwidths, a plurality of bit error rates for the received optical signal after removing the impact of the backpropagated optical field 690, 790 is determined. In order to determine backpropagated optical field 690, 790, receiver processor 121 determines nonlinear compensation coefficients based on SPM and XPM filters that have a default value of an XPM filter bandwidth, a default value of an SPM free parameter, a default value of an XPM free parameter, and one of values of SPM filter bandwidths.

BER for each value of the SPM filter bandwidth is determined in 812. At step 814, the desired BER is determined, or selected, for the whole default range of a SPM filter bandwidths. In at least one embodiment, the desired BER is the lowest BER of the determined BER values. At step 816, SPM filter bandwidth associated with the desired BER is set as the selected SPM filter bandwidth. Such selected SPM filter bandwidth corresponds to the lowest value of BER for the received signal 601, 701.

After setting the selected SPM filter bandwidth, the selected SPM free parameter is determined. In step 822, the SPM free parameter is varied. This variation in the SPM free parameter may be confined within a range of SPM free parameters. In some embodiments the range may be determined based on any or all of the default value of XPM filter bandwidth, the default value of XPM free parameter, and the selected SPM filter bandwidth. For each SPM free parameter, a BER is determined in 822. Receiver processor 121 can determines bit error rates for the received signal after subtracting the effect from backpropagated optical field 690, 790. From this set of BER values, a desired BER is selected in 824. In some embodiments the desired BER may be the lowest BER in the plurality The SPM free parameter corresponding to the desired BER is set as the selected SPM free parameter in 826.

After setting the selected SPM free parameter, the selected XPM filter bandwidth is determined. As above with the other parameters, in step 830 the XPM filter bandwidth is varied. In some embodiments the range of filter bandwidths through which the XPM filter bandwidth is varied may be determined in accordance with a default value of XPM free parameter, the selected SPM free parameter, and the selected SPM filter bandwidth. The BER is measured for each of these variations in 832. From the plurality of BER values generated in 832, a desired BER is selected in 834. The desired BER is often the lowest BER. The XPM filter bandwidth is then set to the XPM filter bandwidth associated with the desired BER.

After setting the selected XPM filter bandwidth, the selected XPM free parameter is set at steps 840, 842, 844, 846. In step 840 the XPM free parameter is varied through a range that can be determined in accordance with the selected SPM filter bandwidth, the selected XPM filter bandwidth, and the selected SPM free parameter. For each of the XPM free parameters a BER is determined in step 842. In step 844 the desired BER is selected. The desired BER may be the lowest BER in some embodiments. In step 846, the XPM free parameter associated with the desired BER is selected.

Figure 9:
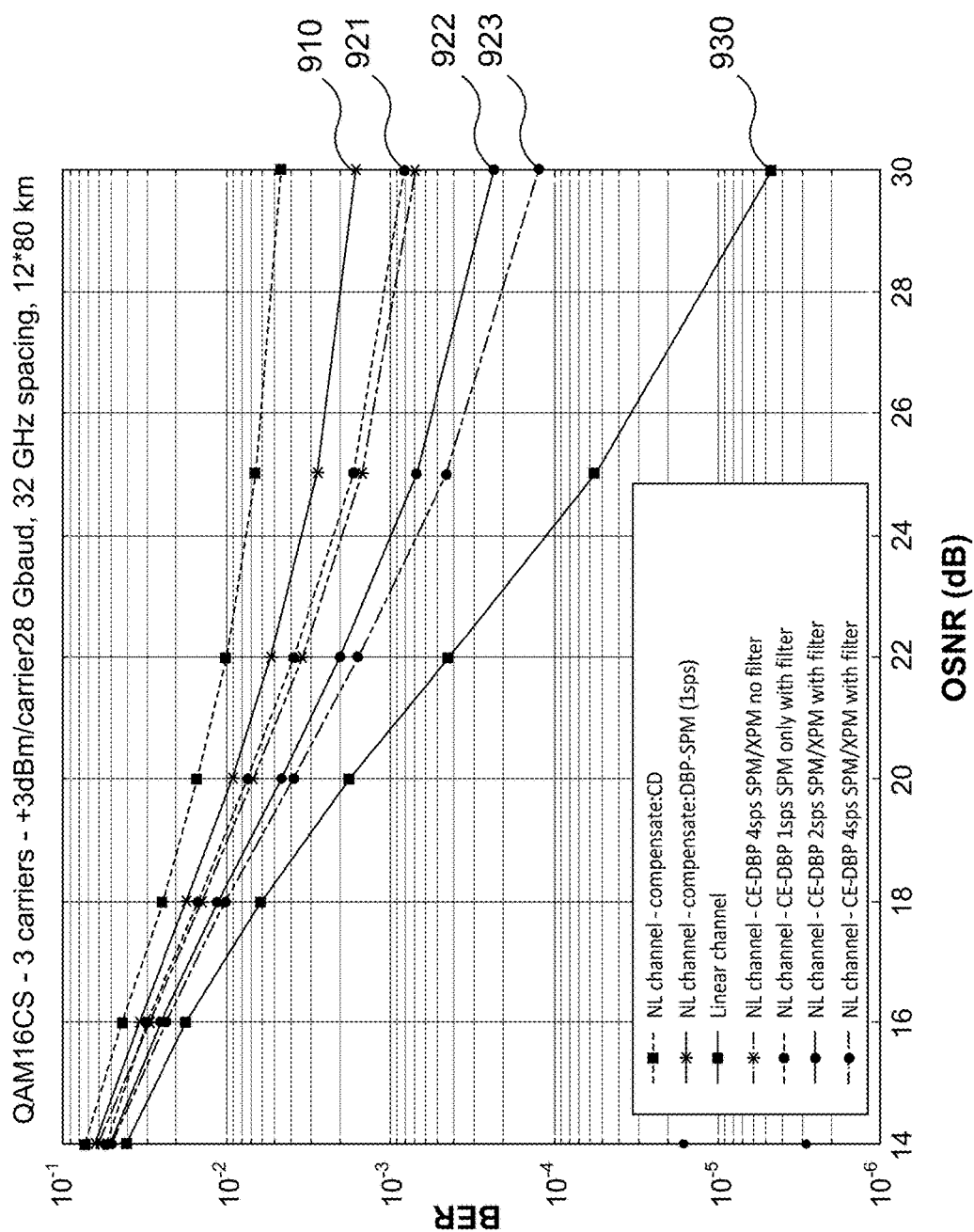
FIG. 9 depicts simulation results of a bit error rate as a function of an optical signal-to-noise ratio.

FIG. 9 depicts simulation results of BER as a function of an optical signal-to-noise ratio (OSNR). The simulations were performed for QAM16CS for 3 sub-channels in a superchannel, at 28 GBaud with 32 GHz spacing for 12*80 km. FIG. 9 depicts simulation results for a linear channel, a single channel and several channels.

Curve 910 was obtained for three carriers and each carrier was only compensated for SPM with DBP technique.

Curves 920 depict BER that was simulated with nonlinear compensation method ECE-DBP technique. Briefly referring to FIG. 6, BER was simulated based on the optical symbols received 601 and the modified digital optical signal 690 that were determined after the compensation for linear and nonlinear effects with method 600.

Referring again to FIG. 9, curve 921 depicts simulations when filters were applied only to SPM components. Curve 922 depicts results of simulations for 2 sps with filters applied to SPM and XPM components. Curve 923 depicts simulations for 4 sps with filters applied to SPM and XPM components.

It should be noted that the simulation results for 4 sps without applying filters (as in conventional CE-DBP technique) were approximately the same as simulation results for isps with the filters applied (as in ECE-DBP technique). Applying the filters with 4 sps (as in ECE-DBP technique) provide better simulation results compared to the simulations without filters (as in conventional CE-DBP technique) for 4 sps.

Figure 10A:
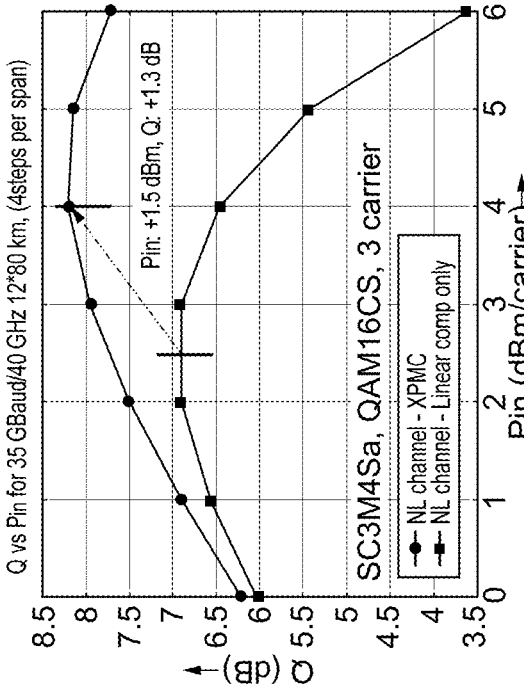
FIGS. 10A, 10B, 10C depict Q-improvements for increasing per-channel Baud Rates.
Figure 10B:
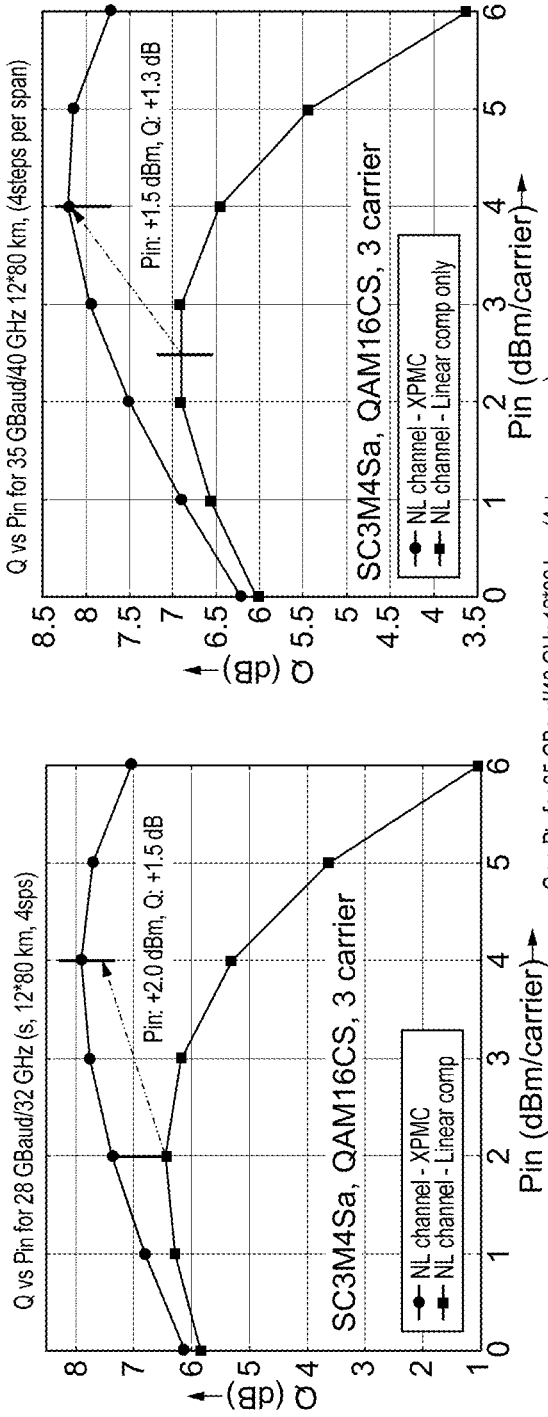
Figure 10C:
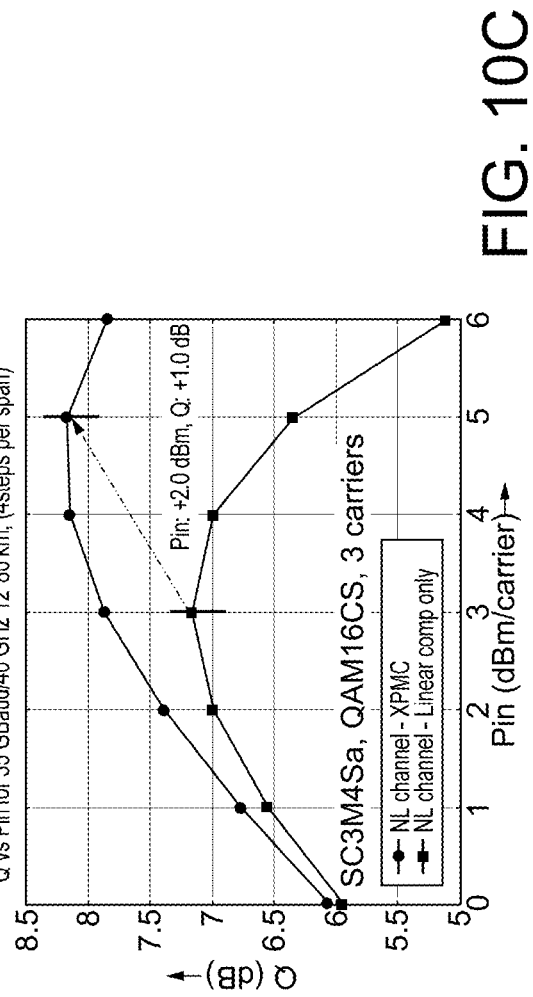

FIGS. 10A, 10B, 10C depict Q-improvements for increasing per-channel Baud Rates (Pin). FIG. 10A depicts 28 Gbaud per sub-channel. By increasing Pin by 2 dBm, Q is increased by 1.5 dB. FIG. 10B depicts 35 Gbaud per sub-channel. FIG. 10C depicts 42 Gbaud per sub-channel. The simulations demonstrated that the launch power may be increased by between 1.5-2 dB compared to linear channel compensation with conventional method 200. Q-factor may be increased by between 1 dB and 1.5 dB compared to linear channel compensation with conventional method 200 of CE-DBP technique.

Figure 11:
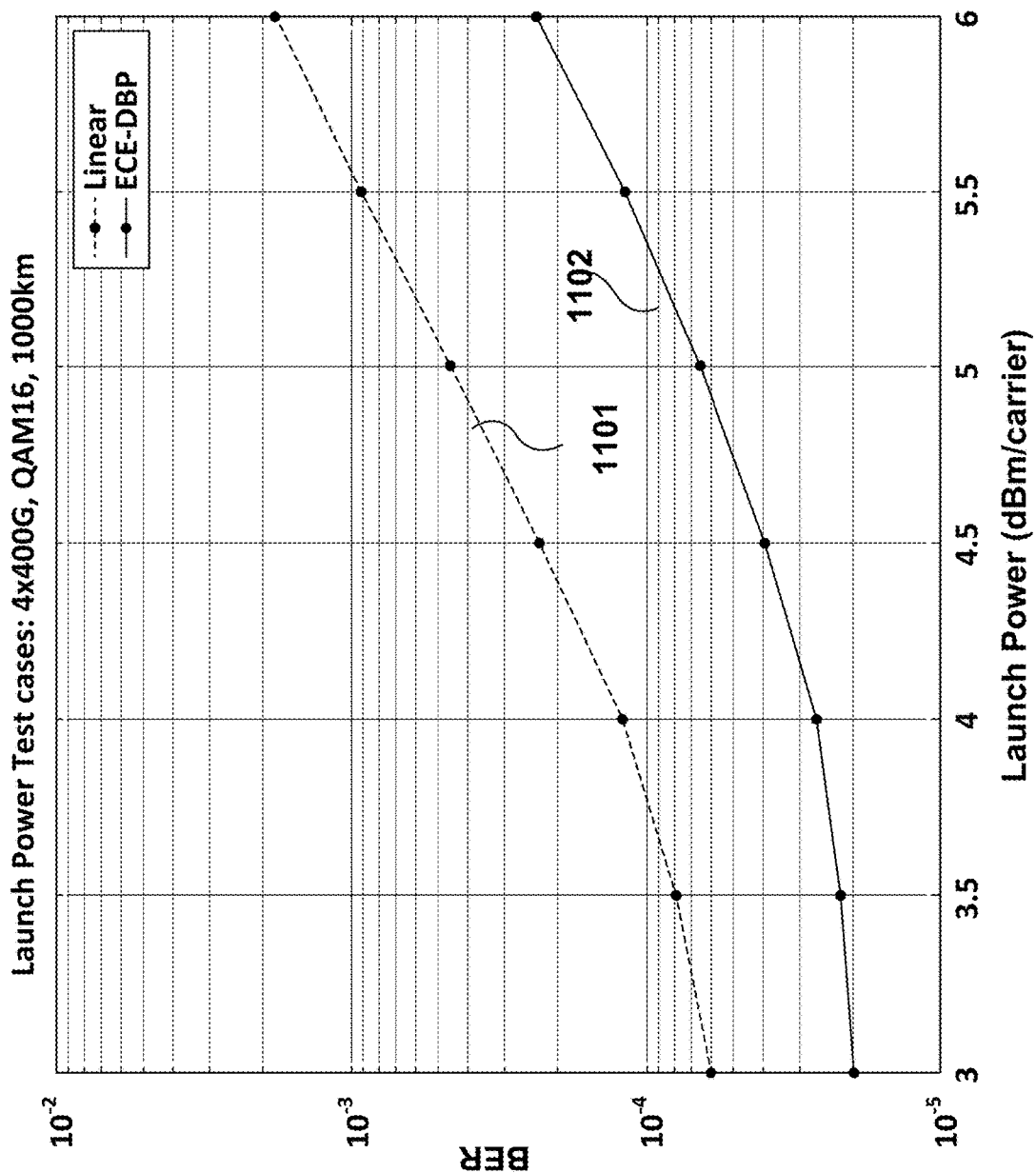
FIG. 11 compares simulation results obtained with a conventional linear compensation technique and with ECE-DBP nonlinear compensation technique, implemented in accordance with at least one embodiment of the instant disclosure.

FIG. 11 compares simulation results obtained with a conventional linear compensation technique and with ECE-DBP nonlinear compensation technique, implemented in accordance with at least one embodiment of the instant disclosure. FIG. 11 depicts BER as a function of a launch power at 1000 km for 4×400 G 16 QAM (1.6 Tbps transmission). Curve 1101 depicts simulation results obtained with the conventional linear compensation technique. Curve 1102 depicts simulation results obtained with the described herein method 500 of ECE-DBP technique for nonlinear compensation. It is illustrated that BER is lower when the nonlinear effects in optical fiber are compensated with the method described herein.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method for compensation of nonlinear effects in an optical fiber on a coherent optical wavelength division multiplexed (WDM) signal transmitted through an optical link, the method comprising:

receiving a coherent optical signal comprising a plurality of sub-channels;

digitizing the received coherent optical signal to generate a digital receive coherent optical signal;

determining instantaneous values of intensity vectors for each of the plurality of sub-channels of the digital receive coherent optical signal;

determining values of filtered intensity vectors for each of the plurality of sub-channels of the digital receive coherent optical signal by filtering the values of the intensity vectors at frequencies lower than a cut-off frequency of a filter, the cut-off frequency being less than a half of a sub-channel bandwidth;

determining nonlinear compensation coefficients for each of the plurality of sub-channels of the digital receive coherent optical signal based on the filtered intensity vectors associated with at least one other sub-channel in the plurality of sub-channels; and modifying the digital receive coherent optical signal in accordance with the determined nonlinear compensation coefficients based on the filtered intensity vectors.

2. The method of claim 1 further comprising:
determining chromatic dispersion in the digital receive coherent optical signal; and
compensating the digital receive coherent optical signal for the chromatic dispersion using a frequency domain equalizer.

3. The method of claim 2, further comprising:
performing multiple input multiple output equalization for removing effects of polarization mode dispersion (PMD); and
compensating for a frequency offset and a phase noise.

4. The method of claim 3, further comprising:
adding a value of chromatic dispersion to the digital receive coherent optical signal; and
modifying the digital receive coherent optical signal based on the nonlinear compensation coefficients.

5. The method of claim 2, further comprising:
modifying the digital receive coherent optical signal based on the nonlinear compensation coefficients simultaneously while applying compensation of the chromatic dispersion, and
applying multiple input multiple output equalization to the modified digital coherent optical signal.

6. The method of claim 1, wherein the sub-channels are subcarriers of a superchannel, the superchannel being an optical channel that binds multiple sub-channels for unified transmission through an optical network from the source to destination node.

7. The method of claim 1, wherein the nonlinear compensation coefficients are determined based on a self-phase modulation (SPM) adaptation parameter and a cross-phase modulation (XPM) adaptation parameter.

8. The method of claim 1, wherein modifying the digital receive coherent optical signal comprises multiplying optical field symbols of the digital receive coherent optical signal by:

$$\exp\left(-\frac{i8}{9}\gamma h_{eff}\left(\xi_{SPM}I_{SPM} + \sum \xi_{XPM}I_{XPMx/y}\right)\right)$$

where $\gamma$ is a nonlinearity parameter of optical fiber span, i represents an imaginary number, $h_{eff}$ represents the effective length of the backpropagation step, $\xi_{SPM}$ represents the SPM adaptation parameter, $\xi_{XPM}$ represents the XPM adaptation parameter, $I_{SPM}$ represents an SPM intensity vector, and $I_{XPMx/y}$ represents an XPM intensity vector.

9. The method of claim 1, wherein filtered intensity vectors of the sub-channel of an optical superchannel are obtained by:
filtering the values of the intensity vectors by a self-phase modulation (SPM) filter to determine an SPM contribution to the nonlinear compensation coefficients for the sub-channel, and
filtering the values of the intensity vectors of neighboring sub-channel to the sub-channel of interest by a cross-phase modulation (XPM) filter to determine an XPM contribution to the nonlinear compensation coefficients for the sub-channel of interest.

10. The method of claim 9, further comprising, for each sub-channel:

determining an SPM adaptation parameter and an SPM filter coefficient of the SPM filter based on a first plurality of bit error rates; and
determining an XPM adaptation parameter and an XPM filter coefficient of the XPM filter based on a second plurality of bit error rates.

11. The method of claim 1, wherein
the filtered intensity vectors for each sub-channel are determined based on a self-phase modulation (SPM) filter and cross-phase modulation (XPM) filter;
the nonlinear compensation coefficients are determined based on a selected SPM adaptation parameter, a selected XPM adaptation parameter, a selected SPM filter bandwidth of the SPM filter, and a selected XPM filter bandwidth of the XPM filter; and
the selected SPM filter bandwidth and the selected SPM adaptation parameter are determined by:
for each value of an SPM filter bandwidth of a plurality of SPM filter bandwidths, and based on a default value of XPM filter bandwidth, a default value of SPM adaptation parameter, and a default value of XPM adaptation parameter, determining a first plurality of bit error rates;
setting the selected SPM filter bandwidth to have the value of one of the plurality of SPM filter bandwidths corresponding to the lowest bit error rate of the first plurality of bit error rates;
for each value of an SPM adaptation parameter of a plurality of SPM adaptation parameters, and based on the default value of XPM filter bandwidth, the default value of XPM adaptation parameter, and the selected SPM filter bandwidth, determining a second plurality of bit error rates; and
setting the selected SPM adaptation parameter to have the value of one of the plurality of SPM adaptation parameters corresponding to the lowest bit error rate of the second plurality of bit error rates.

12. The method of claim 11 further comprising:
for each value of an XPM filter bandwidth of a plurality of XPM filter bandwidths, and based on the default value of XPM adaptation parameter, the selected SPM adaptation parameter, and the selected SPM filter bandwidth, determining a third plurality of bit error rates;
setting the selected XPM filter bandwidth to have the value of one of the plurality of XPM filter bandwidths corresponding to the lowest bit error rate of the third plurality of bit error rates;
for each value of an XPM adaptation parameter of a plurality of XPM adaptation parameters, and based on the selected SPM filter bandwidth, the selected XPM filter bandwidth, and the selected SPM adaptation parameter, determining a fourth plurality of bit error rates; and
setting the selected XPM adaptation parameter to have the value of one of the plurality of XPM adaptation parameters corresponding to the lowest bit error rate of the fourth plurality of bit error rates.

13. An apparatus for compensation of nonlinear effects in optical fiber of a coherent optical signal transmitted through an optical link, the apparatus comprising:
a photodetector configured to receive a coherent optical wavelength division multiplexing (WDM) signal comprising sub-channels each having a finite bandwidth;
an analog-to-digital converter configured to convert the received coherent optical signal into a digital receive coherent optical signal; and a processor configured to:
    determine instantaneous values of intensity vectors for each sub-channel of the digital receive coherent optical signal;
    determine values of filtered intensity vectors for each sub-channel of the digital receive coherent optical signal by filtering the instantaneous values of the intensity vectors at frequencies lower than a cut-off frequency of a filter, the cut-off frequency being less than a half of a sub-channel bandwidth;
    determine nonlinear compensation coefficients for each sub-channel of the digital receive coherent optical signal based on the filtered intensity vectors; and
    modify the digital receive coherent optical signal based on the nonlinear compensation coefficients in accordance with the filtered intensity vectors to compensate for linear and nonlinear effects in an optical fiber.

14. The apparatus of claim 13, wherein the processor is further configured to:
    determine chromatic dispersion in the digital receive coherent optical signal; and
    compensate the digital receive coherent optical signal for the chromatic dispersion using a frequency domain equalizer.

15. The apparatus of claim 14, wherein the processor is further configured to:
    perform multiple input multiple output equalization for removing effects of polarization mode dispersion (PMD); and
    compensate for a frequency offset and a phase noise.

16. The apparatus of claim 15, wherein the processor is further configured to:
    add a value of chromatic dispersion to the digital coherent optical signal; and
    modify the digital receive coherent optical signal based on the nonlinear compensation coefficients.

17. The apparatus of claim 14, wherein the processor is further configured to:
    modify the digital receive coherent optical signal based on the nonlinear compensation coefficients simultaneously while applying compensation of the chromatic dispersion; and
    apply multiple input multiple output equalization to the modified digital coherent optical signal.

18. The apparatus of claim 13, wherein the nonlinear compensation coefficients are determined by the processor based on a self-phase modulation (SPM) adaptation parameter and a cross-phase modulation (XPM) adaptation parameter.

19. The apparatus of claim 13, wherein the filtered intensity vectors for the sub-channel of an optical superchannel are obtained by:
    filtering the values of the intensity vectors by a self-phase modulation (SPM) filter to determine an SPM contribution to the nonlinear compensation coefficients for the sub-channel, and
    filtering the values of the intensity vectors of neighboring sub-channels to the sub-channel of interest by a cross-phase modulation (XPM) filter to determine an XPM contribution to the nonlinear compensation coefficients for the sub-channel of interest.

20. A non-transitory computer readable medium with computer executable instructions stored thereon that, when executed by a processor, cause the processor to:
    receive a digital coherent optical signal comprising sub-channels;
    determine instantaneous values of intensity vectors for each sub-channel;
    determine values of filtered intensity vectors for each sub-channel by filtering the instantaneous values of the intensity vectors at frequencies lower than a cut-off frequency of a filter, the cut-off frequency being less than a half of a sub-channel bandwidth;
    determine nonlinear compensation coefficients for each sub-channel based on the filtered intensity vectors; and
    modify the digital coherent optical signal based on the nonlinear compensation coefficients determined based on the filtered intensity vectors.

\* \* \* \* \*

UNITED STATES PATENT AND TRADEMARK OFFICE
CERTIFICATE OF CORRECTION

PATENT NO. : 10,903,912 B2
APPLICATION NO. : 16/872967
DATED : January 26, 2021
INVENTOR(S) : Rene Janicek and Jeebak Mitra Page 1 of 1

It is certified that error appears in the above-identified patent and that said Letters Patent is hereby corrected as shown below:

On the Title Page

Item (71), under "Applicant", "Guangdong" should read -- Shenzhen --

In the Specification

Column 7, Line 38: "400 G" should read -- 400G --
Column 12, Line 12: "Ispm > Ixpm" should read -- Ispm, Ixpm --
Column 12, Line 13: "Ispm > Ixpm" should read -- Ispm, Ixpm --
Column 18, Line 7: "isps" should read -- 1sps --
Column 18, Line 28: "400 G" should read -- 400G --

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*